US007357860B1

(12) United States Patent
Painter

(10) Patent No.: US 7,357,860 B1
(45) Date of Patent: Apr. 15, 2008

(54) SKIMMER SYSTEM

(76) Inventor: Paul W. Painter, 38850 Town Hall, Harrison Township, MI (US) 48045

( * ) Notice: Subject to any disclaimer, the term of this patent is extended or adjusted under 35 U.S.C. 154(b) by 0 days.

(21) Appl. No.: 11/337,732

(22) Filed: Jan. 23, 2006

(51) Int. Cl.
*C02F 1/40* (2006.01)
(52) U.S. Cl. .................. 210/122; 210/242.3; 210/521; 210/540
(58) Field of Classification Search ............... 210/122, 210/540, 242.3, 521, 538, 532.1
See application file for complete search history.

(56) References Cited

U.S. PATENT DOCUMENTS

| | | | | |
|---|---|---|---|---|
| 54,414 | A | * | 5/1866 | Sangster ...................... 210/521 |
| 1,190,863 | A | * | 7/1916 | Come et al. ................. 210/521 |
| 1,200,951 | A | * | 10/1916 | Kelly, Jr. ..................... 210/540 |
| 2,367,997 | A | | 1/1945 | Chambers |
| 2,989,185 | A | | 6/1961 | Lombardi |
| 3,726,406 | A | | 4/1973 | Damberger |
| 3,782,553 | A | * | 1/1974 | Brekke ..................... 210/242.3 |
| 3,862,039 | A | * | 1/1975 | Summers ..................... 210/540 |
| 3,963,617 | A | | 6/1976 | Kirk et al. |
| 4,053,412 | A | | 10/1977 | Stix |
| 4,059,526 | A | | 11/1977 | Middelbeek |
| 4,132,645 | A | * | 1/1979 | Bottomley et al. .......... 210/540 |
| 4,305,830 | A | | 12/1981 | Shimura |
| 4,454,035 | A | | 6/1984 | Stefan |
| 4,746,424 | A | | 5/1988 | Drew |
| 4,778,599 | A | | 10/1988 | Brooks |
| 5,059,312 | A | * | 10/1991 | Galletti ..................... 210/242.3 |
| 5,236,585 | A | * | 8/1993 | Fink ........................... 210/521 |
| 5,560,826 | A | * | 10/1996 | Szereday et al. .......... 210/532.1 |
| 5,693,218 | A | * | 12/1997 | Yamamoto et al. ......... 210/540 |
| 6,159,362 | A | * | 12/2000 | Gilmore ..................... 210/540 |
| 6,183,654 | B1 | | 2/2001 | Terrien et al. |
| 6,315,131 | B1 | | 11/2001 | Terrien et al. |
| 6,517,715 | B1 | * | 2/2003 | Batten et al. ............... 210/538 |
| 6,638,437 | B2 | | 10/2003 | Terrien et al. |
| 6,790,370 | B2 | | 9/2004 | Terrien et al. |
| 6,827,853 | B2 | | 12/2004 | Terrien et al. |

(Continued)

OTHER PUBLICATIONS

"Oil Skimmers Inc." Product sheet of Oil Skimmers, Inc. 12800 York Road Cleveland, OH 44133 USA E-mail: info@oilskim. com—website www.oilskim.com/6v.asp in html format Author Fiorilli 3 pages, the unit has been on the market for at least 25 years.

(Continued)

*Primary Examiner*—Christopher Upton
(74) *Attorney, Agent, or Firm*—Peter D. Keefe

(57) ABSTRACT

A skimmer system composed of a base and a slidable float assembly. The base has a base chamber defined by a sidewall, an endwall, and a conduit having an intake communicating with the base chamber. The float assembly has a float chamber defined by an outer float wall, an inner float wall and a top plate. The conduit passes through the inner float wall, wherein a flow channel is disposed therebetween. Preferably the inner float wall carries a flow governor, and the upper end of the inner float wall serves as a weir. An air pocket in the float chamber imparts buoyancy to the float assembly such that the weir skims a top layer of a liquid in which the skimmer system is immersed. A separator may then be used to separate the liquid from material floating on the liquid.

14 Claims, 4 Drawing Sheets

U.S. PATENT DOCUMENTS 6,905,611 B2 * 6/2005 Gustafsson ............... 210/122
7,160,473 B2 1/2007 Terrien et al.

OTHER PUBLICATIONS

"Slurp Oil Skimmer" Product sheet of SlickBar Co. 18 Beach Street Seymour, Conn. 06483 e-mail info@slickbar.com—website in html www.slickbar.com/slickbar/oil_skimmers_transfer_pumps_and_hoses/SLURP_skimmer/ Author unknown. 14 pages, The company has been in service since 1960.

"Ultraspin Oil Skimmer" Product sheet of Ultraspin Pty, Ltd. 5 Monomeeth Drive, Mitcham, VIC,3132, Australia email sales@ultraspin.com.au Website in pdf http://www.ultraspin.com.au/PDF-Files/Skimmer.pdf http://www.ultraspin.com.au/oil-skimmer.htm Author Engineeering Manager Ivano Simonetto 4 Pages, The research and development programs started in 1983.

"Alpha Oil Skimmer" Product sheet of Megator Limited Hendon Sunderland, Tyne & Wear, SR1 2NQ England, Email: info@megator.co.uk Website http://www.megator.co.uk/pdf/Alpha_Skimmer.pdf also http://www.megator.co.uk/alpha_oil_skimmer.htm Author unknown. 4 pages The company has been in operation for more than 10 years.

"SkimOil Oil Skimmer" Product sheet of Skimoil, Inc.P.O. Box 6042 Chesterfield, MO 63006-6042 Email info@skimoil.com Website http://www.skimoil.com/floating$_{13}$ weir.htm and http://www.skimoil.com/oil_skimmers.htm Authoe unknown. 5 pages . The Company has been in operation for 5 plus years.

"Vokes Filter Coalescer" Product sheet of SPX-Vokes Killarney, Co Kerry, Ireland Email: Vokes.Sales@dehydration.spx.com Website http://www.vokes.com Author may have been C.G.Vokes Company founded in 1921 by C.G.Vokes.

"Oil Skimmers Inc." Product sheet of Oil Skimmers, Inc. 12800 York Road Cleveland, OH 44133 USA E-mail: info@oilskim.com—website www.oilskim.com/6v.asp in html format Author Fiorilli 3 pages, the unit has been on the market for at least 25 years, no date.

"Alpha Oil Skimmer" Product sheet of Megator Limited Hendon Sunderland, Tyne & Wear, SR1 2NQ England, Email: info@megator.co.uk Website http://www.megator.co.uk/pdf/Alpha_Skimmer.pdf also http://www.megator.co.uk/alpha_oil_skimmer.htm Author unknown. 4 pages The company has been in operation for more than 10 years, no date.

"SkimOil Oil Skimmer" Product sheet of Skimoil, Inc.P.O. Box 6042 Chesterfield, MO 63006-6042 Email info@skimoil.com Website http://www.skimoil.com/floating_weir.htm and http://www.skimoil.com/oil_skimmers.htm Authoe unknown. 5 pages . The company has been in operation for 5 plus years, no date.

* cited by examiner

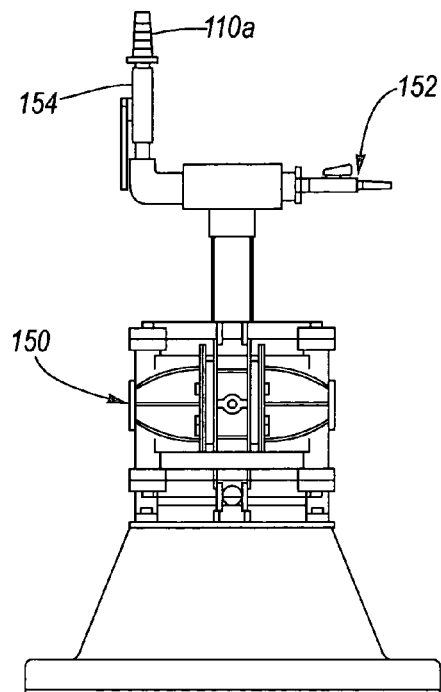
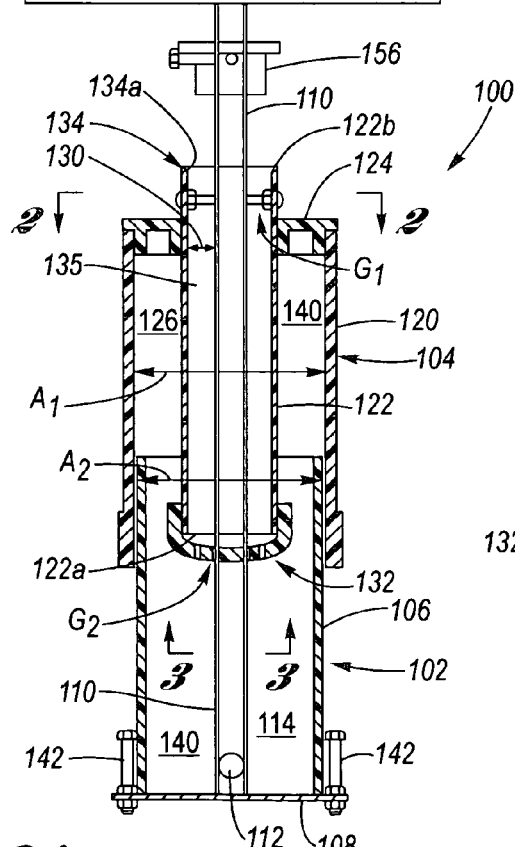
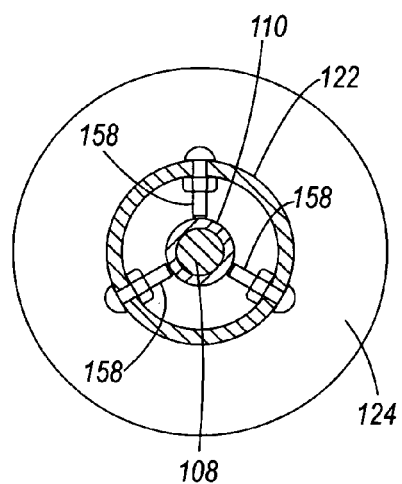
Fig. 2
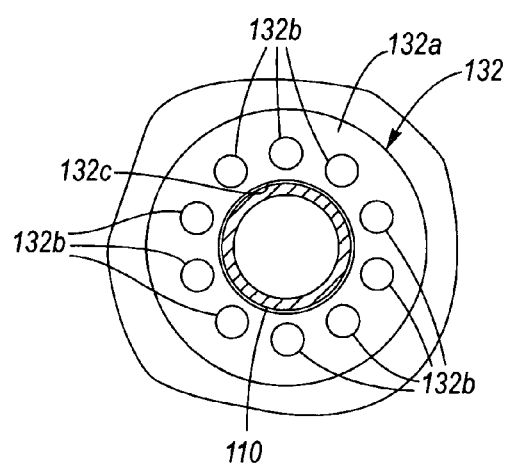
Fig. 3
Fig. 1

SKIMMER SYSTEM

TECHNICAL FIELD

The present invention relates to skimmers used to remove material floating upon a liquid. More particularly, the present invention relates to a skimmer system which removes material floating on a liquid which operates on the principle of a buoyant weir.

BACKGROUND OF THE INVENTION

Skimmers are used to remove material floating upon a liquid (by "material" means any solid or liquid substances). The material may be desirable, as for example a valuable liquid layer floating upon another liquid, or undesirable, as for example a pollutant floating upon a liquid. Some familiar situations include, by way of example, the removal of oil floating on water, removal of debris floating on the surface of a swimming pool, and the separation of differing liquid layers in an industrial process.

A common aspect in the ability to remove material floating on a liquid by skimming is the physical property of specific gravity. Materials (including solids and liquids) with a lower specific gravity will float at the surface of a liquid having a higher specific gravity.

In a typical skimmer device, a weir is provided in combination with movement of a liquid to which skimming is to occur. The weir is buoyant so that it floats in relation to the level of the liquid, and as the liquid is caused (as for example by a pump) to move over the weir, only a top layer of the liquid, which includes the floating material, passes over the weir. As a result, the bulk of the liquid does not pass over the weir, and only a relatively smaller volume top layer passes over the weir which includes most, if not all, the floating material to be removed. Given time, it is desired that all the floating material will have passed over the weir, but left behind (that is, not passed over the weir) is the bulk of the liquid which is now freed of the floating material.

While weir-type skimmers work well, generally they are not compact, usually the weir being in the form of a linear plane which is hinged at one end, and, therefore, the entire top surface of the liquid is not likely to be drawn over the weir unless the liquid is also caused to have a circulation current so that all the surface has a chance to become near the weir over time. Another problem associated with hinged, stationary or otherwise mechanically supported weirs, is their inability to regulate the weir action during wave action of the liquid, whereupon lesser and greater top surface depths pass over the weir in response to the waves striking the weir.

Accordingly, what remains needed is a skimmer system which regulates its weir action very favorably even in wave action of the liquid, and which further draws the top surface of a liquid from all directions so that a circulating current of the liquid is unnecessary for the weir to remove floating material from the liquid over time.

SUMMARY OF THE INVENTION

The present invention is a skimmer system which regulates its weir action very favorably even in wave action of the liquid, and which further draws the top surface of a liquid from all directions so that a circulating current of the liquid is unnecessary for the weir to remove floating material from the liquid over time.

The skimmer system according to the present invention is composed of a stationary base and a float assembly which is slidable in relation to the base and has no mechanical connection thereto.

The base includes a sidewall, an endwall sealingly connected thereto, and a conduit preferably connected to the endwall, wherein the conduit has an intake opening at a lower end thereof adjacent the endwall. A base chamber is defined between the sidewall and the conduit, wherein the intake opening communicates with the base chamber.

The float assembly includes a float chamber defined by an outer float wall, an inner float wall and a top plate which is sealingly connected to the outer and inner float walls and further serves to space them mutually apart. The conduit passes through the inner float wall, wherein a predetermined spacing is provided therebetween which provides a flow channel. Preferably, the lower end of the inner float wall is provided with a liquid flow governor for metering liquid flow therethrough. The upper end of the inner float wall serves as a weir.

The outer float wall has an inner cross-section that exceeds the outside cross-section of the sidewall of the base sufficient to receive thereinto the sidewall, wherein the spacing therebetween is optimized to be small, yet allow free sliding therebetween. The overlap of the outer float wall with respect to the sidewall is predetermined such that all allowed sliding movement of the float assembly relative to the base includes an amount of overlap therebetween. The float chamber and the base chamber mutually communicate and collectively form a float-base chamber. It is preferred for the outer and inner float walls, the conduit and the sidewall of the base to be cylindrically shaped.

In operation of the skimmer system according to the present invention, some air is introduced into the float chamber to provide an air pocket above a liquid within the inner space defined by the float-base chamber, which inner space dynamically changes as the float assembly moves in relation to the base. The air is sufficient so that the float assembly is imparted with buoyancy such that the weir is at or, more preferably, generally adjacently above the liquid level. Next, a pump, which is connected to the conduit, pumps the liquid from the inner space, thereby causing the weir to descend into the liquid, whereupon a top layer of the liquid flows over the weir into the flow channel, then through the liquid flow meter into the inner space of the float-base chamber, wherein a stable steady-state flow is achieved. As the top layer of the liquid passes over the weir, any material floating upon the liquid also goes over the weir and is extracted out the conduit for subsequent action.

A preferred subsequent action is to definitively separate the floating material from the liquid. To this end, a separator is utilized which operates on the principle that there is a specific gravity difference between the liquid and the floating material whereby they can be separated from each other. A preferred separator incorporates dual vertical columns, a first column accumulating the lower specific gravity floating material at its upper end, and a second column accumulating the higher specific gravity liquid at its upper end. A cross-passage interconnects the lower ends of the first and second columns which includes a baffled zone which serves to further induce separation by difference in specific gravity.

Accordingly, it is an object of the present invention to provide a skimmer system which regulates its weir action very favorably even in wave action of the liquid, and which further draws the top surface of a liquid from all directions so that a circulating current of the liquid is unnecessary for the weir to remove floating material from the liquid over time.

This and additional objects, features and advantages of the present invention will become clearer from the following specification of a preferred embodiment.

BRIEF DESCRIPTION OF THE DRAWINGS

FIG. 1 is a partly sectional side view of a skimmer system according to the present invention.

FIG. 2 is a sectional end view, seen along line 2-2 of FIG. 1.

FIG. 3 is an end view, seen along line 3-3 of FIG. 1.

FIGS. 4A through 4C are partly sectional side views of the float assembly and base components of the skimmer system of FIG. 1, wherein FIG. 4A depicts a situation, prior to operation, in which sufficient air is present for future skimming operation, FIG. 4B depicts skimming operation, and FIG. 4C depicts a situation in which too little air is present for future skimming operation.

DESCRIPTION OF THE PREFERRED EMBODIMENT

Figure 6:
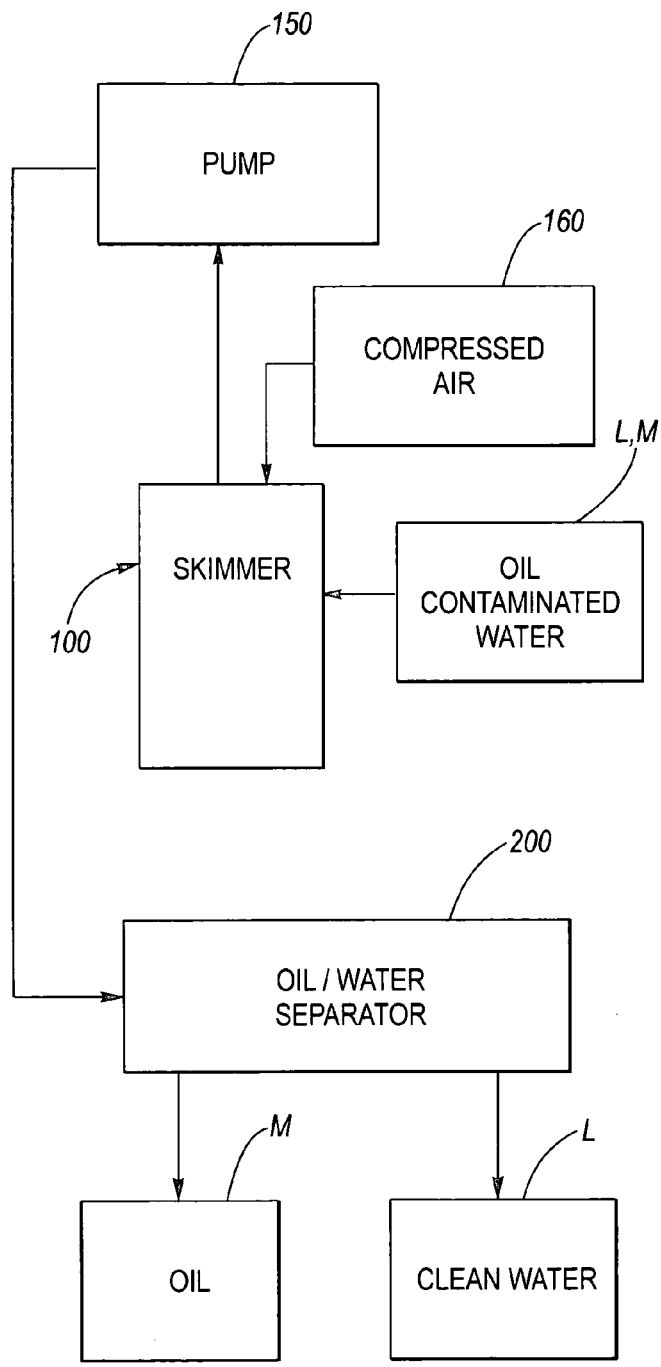
FIG. 6 is a schematic diagram of a skimmer system according to the present invention, including a separator.
Figure 7:
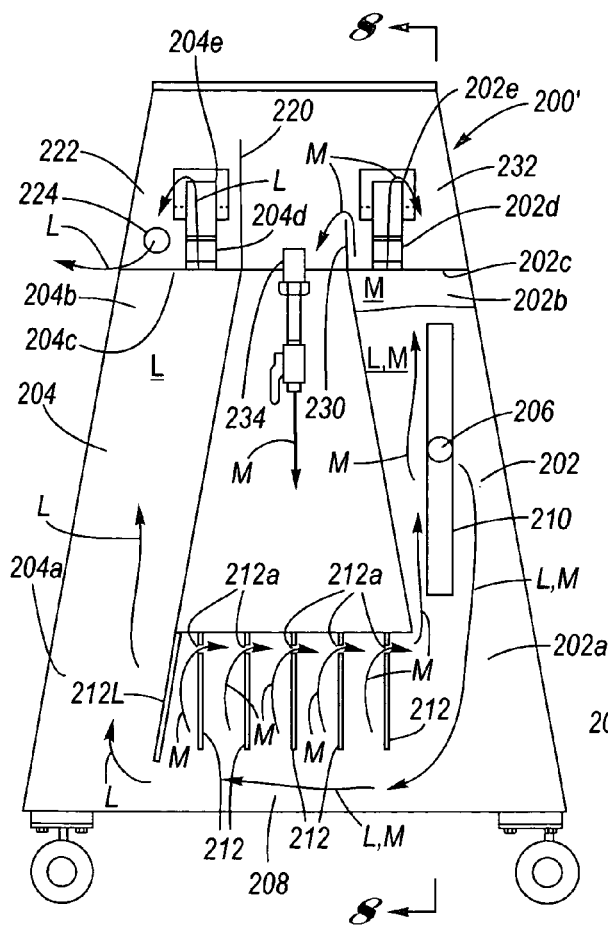
FIG. 7 is a front view of a separator according to the present invention.
Figure 8:
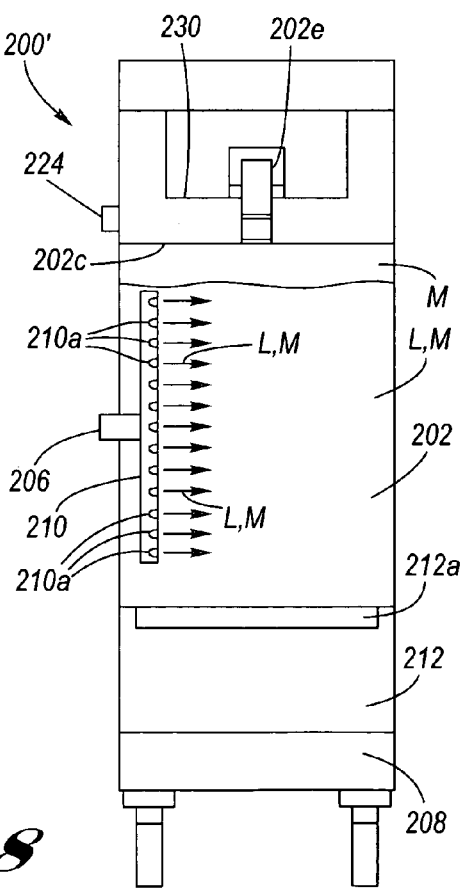
FIG. 8 is a sectional view, seen along line 8-8 of FIG. 7.

Referring now to the Drawing, FIGS. 1 through 5 depict various aspects of a skimmer system according to the present invention; FIG. 6 depicts a operational diagram of the skimmer system in conjunction with a separator; and FIGS. 7 and 8 depict a preferred separator.

The skimmer system 100, shown at FIG. 1, includes a stationary base 102 and a float assembly 104 which is mechanically unconnected to the base and is movably slidable in relation thereto.

The base 102 includes a sidewall 106, an endwall 108 which is sealingly connected to the sidewall, and further includes a conduit 110 preferably connected to the endwall, wherein the conduit has an intake opening 112 at a lower end thereof which is in adjacency to the endwall. A base chamber 114 is defined between the sidewall 106 and the conduit 110, wherein the intake opening 112 communicates openly with the base chamber 114.

The float assembly 104 includes an outer float wall 120, an inner float wall 122 and a top plate 124 which is sealingly connected to the outer and inner float walls, whereby the outer and inner float walls are mutally spaced apart and thereby define a float chamber 126. The conduit 110 extends through, in concentric disposition, the inner float wall 122, wherein a spacing 130 is provided therebetween which is of a preselected size so as to provide a flow channel 135 therebetween.

Preferably, the lower end 122a of the inner float wall 122 has a liquid flow governor 132. Referring additionally to FIG. 3, the liquid flow governor 132 is preferably in the form of a cap 132a having a plurality of apertures 132b which serve to restrictively meter liquid flow therethrough, as will be further discussed hereinbelow.

The upper end 122b of the inner float wall 122 serves as a weir 134. In this regard, it is preferred for the weir 134 to be in the form of a thinned edge defined by an inner disposed beveling 134a at the upper end 122b.

The outer float wall 120 has an inner cross-section $A_1$ that exceeds the outside cross-section $A_2$ of the sidewall 106 of the base 102 sufficiently so that the sidewall is receivable into the outer float wall, wherein the spacing therebetween is optimized to be small, yet allow free sliding therebetween, as will be discussed further hereinbelow. The overlap of the outer float wall 120 with respect to the sidewall 106 is maintained during all operational sliding movement of the float assembly 104 relative to the base 102. It will be seen at FIG. 1 that the float chamber 126 and the base chamber 114 mutually communicate with each other and they collectively form a float-base chamber 140.

It is preferred for the outer and inner float walls 120, 122, the conduit 110 and the sidewall 106 of the base 102 to be cylindrically shaped. It is also preferred for a plurality of mounting screws 142 to be provided at the endwall 108 for mounting or leveling with respect to an external tank holding in a liquid to be skimmed, or other structure. By way of example, the conduit 110 may be a ½ inch inner diameter pipe.

The conduit 110 is connected to a pump 150, which may be an electric pump, or, more preferably depending on the application, a pneumatically powered pump. A compressed air inlet valve 152 is connected with the conduit 110, as is also a shut-off valve 154. A nipple 110a, or other feature, may be connected with the shut-off valve 154 for providing a downstream piping interface. A diffuser 156 is additionally connected with the conduit 110, wherein the diffuser has a diffuser body in which a plurality of circumferentially arranged, downwardly directed exit holes 156a are formed therein, the exit holes being open at the bottom 156b, and where the placement of the diffuser along the conduit 110 is selected by a set-screw 156c (see FIG. 5).

The conduit 110 preferably serves as a structural support for the pump 150, the air inlet valve 152, the shut-off valve 154, and the diffuser 156. Additionally, the conduit 110 serves as a guide for sliding movement of the float assembly 104. In this regard, a plurality of spacers 158, preferably in the form of threadably adjustable studs, interface with the inner float wall 122 and loosely abut the conduit 110 to provide a first guidance location $G_1$, while the cap 132a of the liquid flow governor 132 has a central aperture 132c which loosely abuts the conduit so as to provided a second guidance location $G_2$ which is spaced from the first guidance location.

Figure 4C:
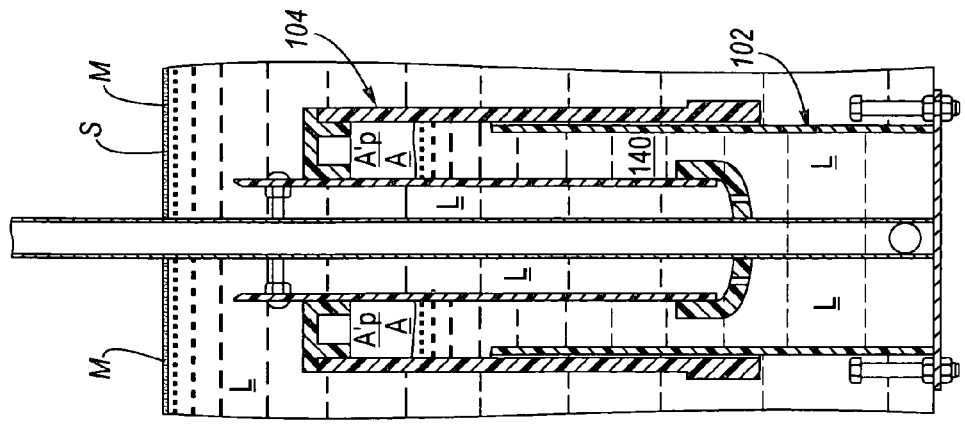
Figure 4B:
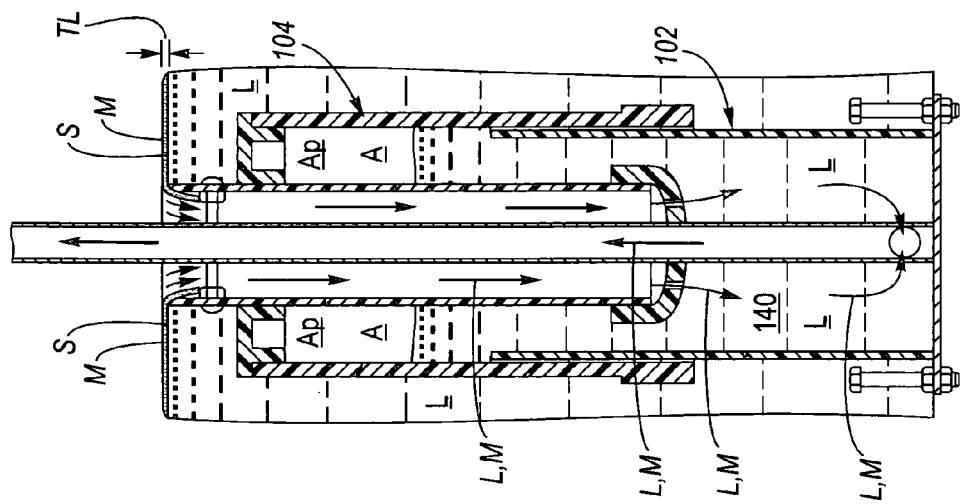
Figure 4A:
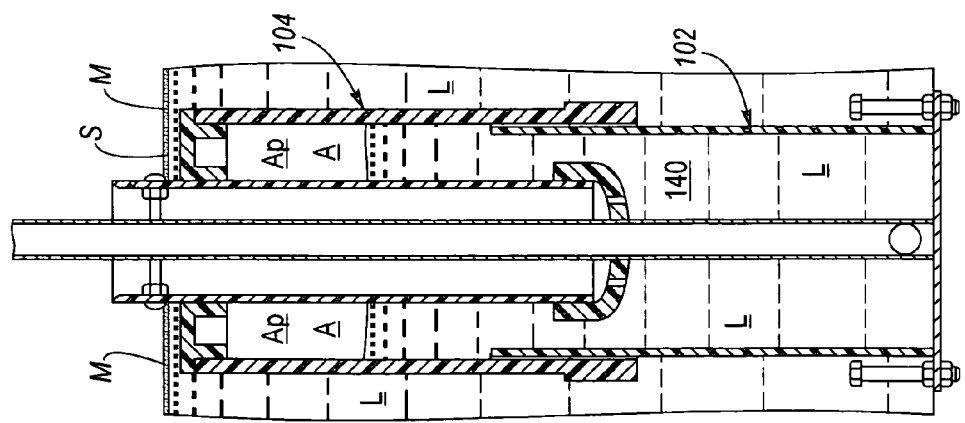
Figure 5:
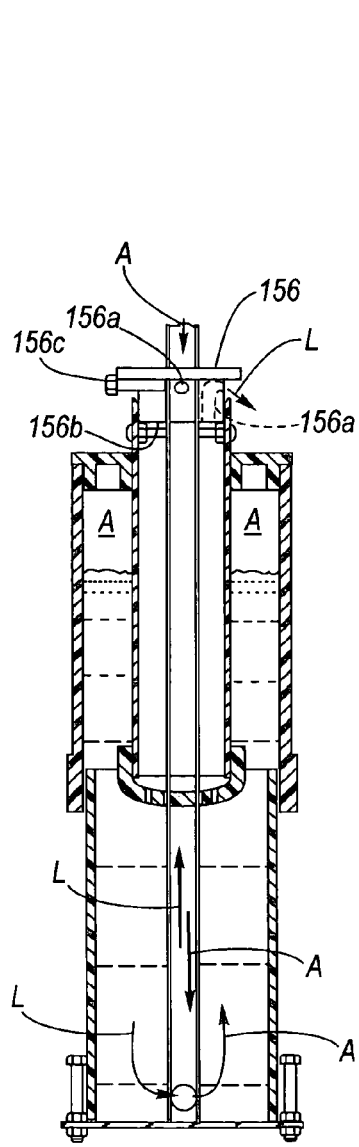
FIG. 5 is a similar view to that of FIG. 4A, wherein now a diffuser is in operation to safely diffuse displaced liquid as air is introduced into the float-base chamber of the skimmer system according to the present invention.

Referring now additionally to FIGS. 4A through 5, operation of the skimmer system 100 according to the present invention will be described.

The base 102 and float assembly 104 are located in some liquid L having floating thereupon some material M. Some air A is introduced into the float chamber 126 from a source of compressed air 160 (see FIG. 5) via the air inlet valve 152 to provide an air pocket $A_P$ above the liquid L within the inner space defined by the float-base chamber 140, which inner space volume dynamically changes as the float assembly 104 slidably moves in relation to the base 102. The air volume is sufficient so that the float assembly is imparted with buoyancy such that the weir 134 is at or, more preferably, generally adjacently above the liquid surface S, as shown at FIG. 4A. The air inlet valve 152 is then closed.

Next, the pump 150 is actuated and the liquid in the float-base chamber is extracted out the conduit 110 via the intake opening 112 thereof. As the liquid extracts, the float assembly descends into the liquid and the weir descends to just below the liquid surface defined by a top layer TL of the liquid. The top layer TL includes the floating material M, and as the liquid flows over the weir into the flow channel and out through the liquid flow meter so does the floating material, collectively designated as L,M. As shown at FIG. 4B, as the top layer TL of the liquid passes over the weir, any floating material M upon the liquid also goes over the weir and the combination L,M is extracted out the conduit for subsequent action.

The weir stays near the liquid surface in a self-implementing and self-regulating manner based upon the buoyancy of the float assembly and the fluid dynamics of the liquid flow over the weir, which dynamically follows any wave or undulation action of the liquid surface, and wherein always a stable steady-state flow of liquid over the weir occurs. In the event the pump cycles quickly or the water is undulating, the liquid flow governor 132 prevents the weir from bobbing or "porpoising". The apertures 132b in the cap 132a are optimal for this purpose based upon empirical evaluation. By way of example, ten 0.75 inch diameter apertures may be circularly arranged on 4.318 inch radii of the cap.

It should be noted that if the air pocket $A_P'$ has an insufficient volume to buoy the float assembly 104, then the weir will be disposed below the liquid level, as shown at FIG. 4C, wherein during operation, the ability of the weir to skim will be reduced, or in worst case scenario lost, as the weir will not be adjacent the liquid surface so as to skim the top layer TL thereof.

Adjustment of the air pocket volume need only be generally made, and is suitable over a wide range of volumes, wherein additional air may be introduced at the air inlet valve 152 with the with the shut-off valve 154 closed, and any excess air may be bled at the air inlet valve. In this regard when air is introduced, liquid L within the float-base chamber 140 could be rapidly displaced through the flow passage 135 and out the weir 134 as air A enters. As shown at FIG. 5, prevention of untoward spray of liquid is provided by the diffuser 156. As air A enters the float-base chamber 140 and the float assembly 104 rises, the diffuser body of the diffuser 156 will enter the weir 134, such that the displaced liquid L must pass through the exit holes 156a and then downwardly emerge harmlessly toward the liquid surface.

As shown at FIG. 6, a preferred subsequent action is to definitively separate the floating material from the liquid. To this end, a separator 200 is utilized which operates on the principle that there is a specific gravity difference between the liquid and the floating material whereby they can be separated from each other. By way of example in FIG. 6, the floating material M is oil, and the liquid L is water, wherein the water with oil floating at its surface is an oil contaminated water L,M, and the operation and components of the skimmer system is as described hereinabove.

FIGS. 7 and 8 depict a preferred separator 200' which incorporates first and second vertical columns, 202, 204, an inlet 206 in the first column, and a cross-passage 208 between the first and second columns at the lower ends 202a, 204a thereof. The inlet 206 receives the liquid with the floating material L,M extracted from the top layer of the liquid by the skimmer system 100 via its conduit 110. Preferably, a distribution bar 210 with a plurality of outlets 210a is provided at the inlet and disposed interior to the first column.

The first column 202 will accumulate the lower specific gravity floating material M at its upper end 202b as the incoming liquid with material L,M from the inlet 206 enters. The entering liquid with material L,M will also travel toward the second column 204 by passing through the cross-passage 208. In so passing, the liquid with material L,M passes below a series of baffles 212, 212L of which the baffles 212, excepting the last baffle 212L, have top openings 212a. As the liquid with material L,M passes below the baffles 212, 212L material M floats upwardly and passes toward the first column via the top openings 212a, then into the first column and thereupon drifts upwardly to the upper end 202b thereof. Accordingly, at the upper end 204b of the second column 204 is liquid L absent the material M (which is concentrated at the upper end 202b of the first column 202.

The upper end 202b, 204b of the first and second columns 202, 204 have a first and second top wall 202c, 204c, respectively. To extract material M at the upper end 202b of the first column 202, a first extraction port 202d is provided in the first top wall 202c; and to extract liquid L at the upper end 204b of the second column 204, a second extraction port 204d is provided in the second top wall 204c. In order to balance the rates of extraction of the liquid L and the material M based upon their respective specific gravities, the first and second extraction ports 202d, 204d include open top first and second collection cups 202e, 204e with respective heights mutually set by empirical adjustment so that the rates of extraction are generally balanced, wherein only one of the cups need be selectively height adjustable. In the case of the liquid L, a relatively high retaining wall 220 provides a liquid sump 222, and the liquid is removed at a liquid outlet 224 to any location, including back to the liquid in which the skimmer system 100 is immersed (per FIG. 4B). In the case of the material M, a relatively low retaining wall 230 provides a material sump 232, and the material is removed at a material outlet 234 to any location, as for example a barrel or tank.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:
1. A skimmer system, comprising:
   a base defining a base chamber;
   a float assembly defining a float chamber; wherein said float assembly is freely slidable with respect to said base, and wherein said base and float chambers mutually communicate so as to collectively form a float-base chamber, said float assembly further comprising:
      a weir connected to an upper portion of said float assembly; and
      a flow channel extending between said weir and said float-base chamber;
   a conduit having an inlet communicating with said base chamber, said conduit extending exteriorly in relation to said float-base chamber;
   a pump connected with said conduit; and
   a selectively closeable air inlet connected to said conduit;
   wherein when said skimmer system is placed into a liquid, said float-base chamber is flooded with the liquid and air provided by said air inlet provides an air pocket in said float chamber selected such that the air renders said float assembly buoyant in the liquid; and wherein when said pump extracts the liquid from the float-base chamber, said float assembly slides in relation to said base such that said weir skims a top surface of the liquid into the flow channel.

2. The skimmer of claim 1, further comprising:
a flow governor connected with said flow channel.

3. The skimmer assembly of claim 2, further comprising a diffuser connected with said conduit, said diffuser comprising:
a diffuser body mounted on said conduit; and
a plurality of exit holes formed in said diffuser body;
wherein as air is introduced into said float-base chamber via said air inlet and said float assembly floats toward said diffuser body, said diffuser body enters said weir, whereupon liquid within said float-base chamber which is displaced by the further introduction of the air passes out said flow channel via said plurality of exit holes.

4. The skimmer of claim 1, wherein:
said base comprises:
a sidewall and an end wall sealingly connected to said sidewall; and
said float assembly comprises:
an outer float wall;
an inner float wall; and
a top wall sealingly interconnected with said outer and inner walls which thereby defines said float chamber;
further wherein:
said conduit passes through said inner float wall and extends to said end wall of said base;
a space between said conduit and said inner float wall comprises said flow channel;
said base chamber is defined by said conduit, said sidewall and said endwall; and
said outer float wall receives said sidewall such that said outer float wall is slidable in relation to said sidewall.

5. The skimmer assembly of claim 4, further comprising a flow governor connected to said inner float wall.

6. The skimmer assembly of claim 5, further comprising a diffuser connected with said conduit, said diffuser comprising:
a diffuser body mounted on said conduit; and
a plurality of exit holes formed in said diffuser body;
wherein as air is introduced into said float-base chamber via said air inlet and said float assembly floats toward said diffuser body, said diffuser body enters said weir, whereupon liquid within said float-base chamber which is displaced by the further introduction of the air passes out said flow channel via said plurality of exit holes.

7. A separator, comprising:
a first column having a generally vertical orientation;
a second column having a generally vertical orientation;
a cross-passage between said first and second columns which provides communication between a bottom end of said first column and a bottom end of said second column;
a first port connected to a top end of said first column;
a second port connected to a top end of said second column;
a series of baffles in said cross-passage, said series of baffles comprising:
a last baffle adjacent said lower end of said second column; and
a plurality of baffles extending between said last baffle and said lower end of said first column, wherein each baffle of the plurality of baffles has a top opening formed therein; and
an inlet communicating with said first column.

8. The separator of claim 7, further comprising:
a first cup connected with said first port;
a first sump communicating with said first cup;
a first outlet communicating with said first sump;
a second cup connected with said second port, wherein at least one of said first and second cups is vertically adjustable with respect to the top end of its respective column of said first and second columns;
a second sump communicating with said second cup;
a second outlet communicating with said second sump;
wherein when a liquid with a material of lesser specific gravity than the liquid is introduced into the first column via the inlet, the material collects at the top end of the first column, exits at the first port and passes out the first outlet, and the liquid is at least substantially free of the material at the top end of the second column, exits at the second port, and passes out the second outlet.

9. A skimmer system and separator combination, comprising:
a skimmer system comprising:
a base defining a base chamber;
a float assembly defining a float chamber; wherein said float assembly is freely slidable with respect to said base, and wherein said base and float chambers mutually communicate so as to collectively form a float-base chamber, said float assembly further comprising:
a weir connected to an upper portion of said float assembly; and
a flow channel extending between said weir and said float-base chamber; and
a conduit having an inlet communicating with said base chamber, said conduit extending exteriorly in relation to said float-base chamber; and
a separator, comprising:
a first column having a generally vertical orientation;
a second column having a generally vertical orientation;
a cross-passage between said first and second columns which provides communication between a bottom end of said first column and a bottom end of said second column;
a first port connected to a top end of said first column;
a second port connected to a top end of said second column
a series of baffles in said cross-passage, said series of baffles comprising:
a last baffle adjacent said lower end of said second column; and
a plurality of baffles extending between said last baffle and said lower end of said first column, wherein each baffle of the plurality of baffles has a top opening formed therein; and
an inlet communicating with said first column and connected to said conduit.

10. The combination of claim 9, further comprising:
a pump connected with said conduit; and
a selectively closeable air inlet connected to said conduit;
wherein when said skimmer system is placed into a liquid, said float-base chamber is flooded with the liquid and air provided by said air inlet provides an air pocket in said float chamber selected such that the air renders said float assembly buoyant in the liquid; and wherein when said pump extracts the liquid from the float-base chamber, said float assembly slides in relation to said base such that said weir skims a top surface of the liquid into the flow channel.

11. The combination of claim 10, wherein:

said base comprises:
- a sidewall and an end wall sealingly connected to said sidewall; and said float assembly comprises:
- an outer float wall;
- an inner float wall; and
- a top wall sealingly interconnected with said outer and inner walls which thereby defines said float chamber;

further wherein:
- said conduit passes through said inner float wall and extends to said end wall of said base;
- a space between said conduit and said inner float wall comprises said flow channel;
- said base chamber is defined by said conduit, said sidewall and said endwall; and
- said outer float wall receives said sidewall such that said outer float wall is slidable in relation to said sidewall.

12. The combination of claim 11, further comprising a flow governor connected to said inner float wall.

13. The combination of claim 12, further comprising a diffuser connected with said conduit, said diffuser comprising:
- a diffuser body mounted on said conduit; and
- a plurality of exit holes formed in said diffuser body;

wherein as air is introduced into said float-base chamber via said air inlet and said float assembly floats toward said diffuser body, said diffuser body enters said weir, whereupon liquid within said float-base chamber which is displaced by the further introduction of the air passes out said flow channel via said plurality of exit holes.

14. The combination of claim 13, further comprising:
- a first cup connected with said first port;
- a first sump communicating with said first cup;
- a first outlet communicating with said first sump;
- a second cup connected with said second port, wherein at least one of said first and second cups is vertically adjustable with respect to the top end of its respective column of said first and second columns;
- a second sump communicating with said second cup;
- a second outlet communicating with said second sump;

wherein when a liquid with a material of lesser specific gravity than the liquid is introduced into the first column via the inlet, the material collects at the top end of the first column, exits at the first port and passes out the first outlet, and the liquid is at least substantially free of the material at the top end of the second column, exits at the second port, and passes out the second outlet.

* * * * *